May 7, 1929.    R. BARONIS    1,711,714

VEHICLE LOCK

Filed Oct. 26, 1927    2 Sheets-Sheet 1

Inventor:
Renato Baronis
By
Attorney

May 7, 1929.  R. BARONIS  1,711,714
VEHICLE LOCK
Filed Oct. 26, 1927   2 Sheets-Sheet 2
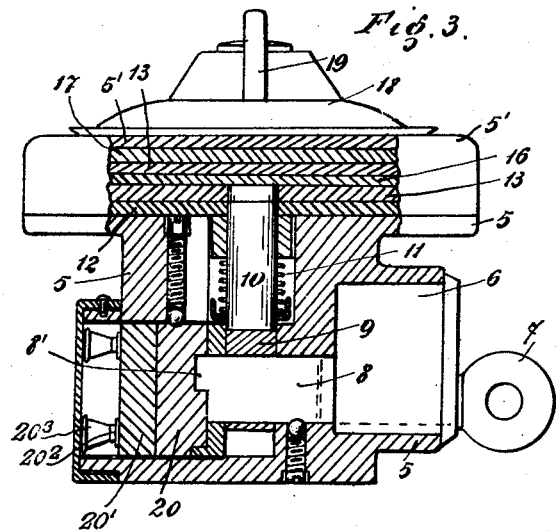
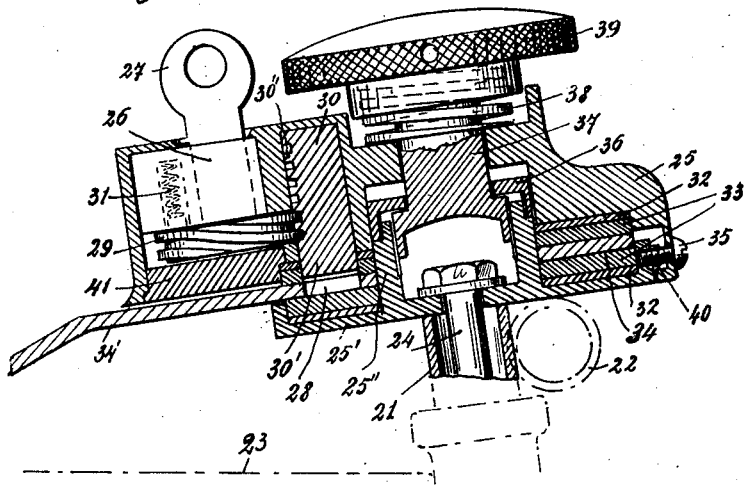
Inventor:
Renato Baronis
By
Attorney Patented May 7, 1929.

1,711,714

UNITED STATES PATENT OFFICE.

RENATO BARONIS, OF TORINO, ITALY, ASSIGNOR TO SEVERINO CRISTIANI, OF MILAN, ITALY.

VEHICLE LOCK.

Application filed October 26, 1927, Serial No. 228,839, and in Italy October 30, 1926.

The present invention relates to vehicle locks; and its object, briefly stated, is to provide an improved lock of the character indicated, which is designed for attachment to the upper part of the steering post of the vehicle in such a manner as to enable the post to be locked against turning movement.

The invention is specially applicable to motor cycles and bicycles; and when so used, it is secured to the steering post or fork immediately adjacent the handle bar, and is connected with the horizontal top bar of the frame, so that when the lock is in action it prevents the handle bar from being turned. If desired, the latter can be operated to swing the front wheel into inclined position to one side or the other, before being locked, in which event it would be impossible to drive the vehicle in a straight line.

According to the invention, an apertured locking disk is arranged within the casing of the device and is rigidly fastened by means of an extension or arm to the frame. A cylinder lock is also mounted in the casing, the cylinder thereof having attached to it a member for actuating a locking bolt which is thereby caused to move into or out of the aperture or hole in the disk; and means are also provided whereby the rotation of the lock cylinder by its key acts to open and close the magneto circuit, the arrangement being such that the circuit is broken when the lock is in action, and vice versa.

In the accompanying drawings, which show two different forms of the invention as applied to a motor cycle:

Fig. 3 is a cross-section on line A—B of Fig. 1; and

Fig. 4 is a vertical axial section of the other form.

Figure 1:
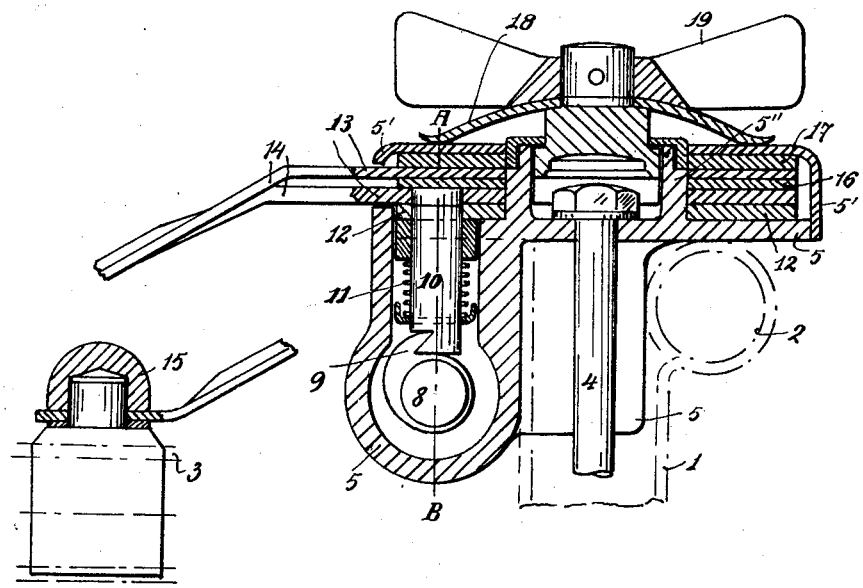
Figure 1 is a vertical axial section of one form, showing the parts in unlocked position.
Figure 2:
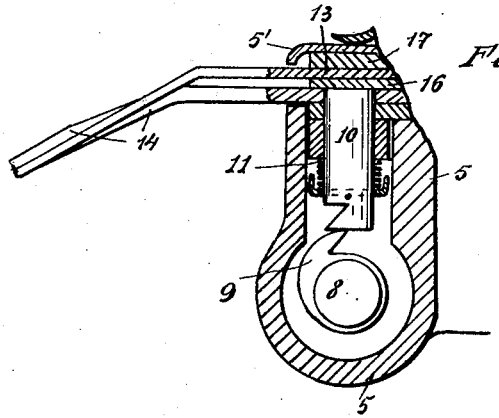
Fig. 2 is a detail, with the parts locked.

Referring to Figs. 1–3, 1 indicates the usual steering post of a conventional motor cycle, 2 the handle bar, and 3 the frame (more specifically, the upper horizontal bar of the frame).

The lock, which constitutes the invention proper, comprises a casing or body 5 and a cover 5'; these two parts being secured together by a tooth-and-slot connection or the like, and the casing being attached to the post 1 by means of the usual bolt 4 which fastens the post to the wheel fork (not shown). The casing also provides a mounting for a suitable lock 6 of the pin-tumbler type, the rotary barrel or cylinder of which is operated by a key 7 and has connected to it an extension or shaft 8.

The upper member of the casing is circular and supports a metal disk or ring 12, upon which rest the disk-like hubs 13 of two arms 14, with an interposed rubber washer 16 between them, another ring 17 resting upon the upper hub 13. The aforesaid casing top or member is formed with a central hollow projection or boss 5'' which is encircled by the parts 12, 13, 13, 16 and 17; and in this boss screws a winged nut or plug 19 carrying a spring washer 18 that bears on the top of the cover 5', so that the rotation of the nut will thus control the pressure of the spring and, hence, the turning movement of the steering post. The two arms 14 are rigidly joined together, and one of them is securely fastened at its rear end at 15 to the frame bar 3, as indicated in Fig. 1.

In order to lock the casing against turning movement and, in consequence, the steering post itself, the lower hub 13 is provided with a series of openings (only one of which appears) for selective registration with an opening in the disk or ring 12, and a bolt 10 is designed to extend through the registering openings, thereby preventing movement of the casing with relation to arms 14. The hub openings may be so arranged that the steering wheel which, as will be understood, turns with the post, is locked in line with the frame or inclined to either side. The upper end of the bolt is engaged at all times in the opening in ring 12, such opening serving, therefore, as a guide for the bolt.

Operation of the bolt 10 is effected by means of a cam 9 which is fastened on the shaft 8; the latter, as previously explained, being connected to the rotary barrel or cylinder of lock 6. Rotation of the cam in one direction will positively force the bolt upward into locking position (Fig. 2); whereas its rotation in the opposite direction will enable the bolt to move downward under the influence of a spring 11. The lower end of the bolt may be notched, as shown, and the cam may be provided with an undercut portion or tooth for interlocking engagement therewith, so as to prevent accidental upward movement of the bolt into engagement in one of the holes or openings in the locking hub 13.

It is intended that the operation of the key to lock the casing and steering post against movement shall also open the magneto circuit, which latter, conversely, is closed when the casing is unlocked. This is effected, according to the invention, by providing a rotary block 20 (Fig. 3), to which is rigidly attached a conducting member 20′ carrying a pair of contacts 20² for cooperation with a second pair of contacts 20³ to open and close the circuit; the various conducting wires being omitted to avoid confusion. When the parts are in the unlocked position illustrated in Fig. 3 (which is the same as that represented in Fig. 1), the two pairs of contacts are engaged and the circuit is closed; but when the bolt 10 is locked (Fig. 2), they will be disengaged, with the result that the circuit is opened. Rotation of block 20 is produced by forming the inner end of shaft 8 with teeth 8′ (Fig. 3) for engagement with the adjacent face of the block, which is likewise toothed. The switch of the lighting circuit can also be operated in a similar way.

The construction illustrated in Fig. 4, comprises, in the main, the same parts or elements as the first form, but with a slightly different arrangement, and operates in much the same manner. 21 indicates the steering post, 22 the handle bar, 23 the frame, and 24 the connecting bolt.

The lock casing 25 has a separate base 25′ which is connected to it in a manner to cause the two to turn or rotate in unison, while permitting a slight axial movement of the casing, this being due to the provision of a pin-and-slot connection 40; and two or more additional fastening screws 35 (only one of which appears) may be employed which are engaged in bayonet slots formed in base 25′. The latter has an upstanding annular projection or boss 25″ which is encircled by a pair of metal disks or rings 33, between which a steel locking disk 34, analogous to the locking hub 13 of the first form, is interposed; and rubber rings or washers 32 are positioned between the upper disk 33 and the top of the casing and between the lower disk and the base 25′.

The upper portion of boss 25″ is threaded both externally and internally; the inner threads having engaged therewith the threaded lower portion of a plug or nut 37 which is prevented from becoming displaced by means of a cap 36 that is screwed on the externally-threaded part of the boss. The stem of the plug extends loosely through alining openings in the cap and casing and carries on its projecting end a knob 39, with an expansible coil spring 38 interposed between the base of the knob and the adjacent surface of the casing top.

Disk 34 is provided with a rearwardly-extending arm 34′ that is adapted to be rigidly fastened to the frame bar 23; and said disk is further provided with one or more locking openings or holes, suitably positioned therein, one such hole being indicated at 28. A similar hole is formed in the upper disk or ring 33 and constantly receives the free lower end 30′ of the locking bolt 30. As in the first form, this bolt can be projected downward into engagement in the hole beneath it in disk 34, so as to lock the casing and the steering post against turning; such movement being effected by providing the bolt with a set of rack teeth 30″ which are engaged by a helically-toothed member or worm 29 that is connected to the rotary barrel or cylinder of the lock 26. The latter and the bolt fit in suitable sockets in the casing, and a key 27 is employed for turning the lock cylinder; a spring-loaded ball or other catch 31 being provided to check the rotation of the worm at the end of a complete revolution thereof and thus determine the limits of its rotary movement in either direction. A plate 41, screwed into the bottom of the casing, may be provided to prevent displacement of access to the lock 26.

The operation of this form is the same as that of the first form and, hence, requires no separate explanation.

I claim as my invention:

1. A steering post lock for vehicles, comprising a casing secured to the post to turn therewith; a locking disk loosely arranged in the casing and provided with an arm which is rigidly fastened to the vehicle frame; a key-actuated cylinder lock disposed in the casing; a bolt movable into and out of engagement with the locking disk to lock the casing against movement relative thereto; and connections between the lock cylinder and the bolt for operating the latter when the former is rotated.

2. A steering post lock for vehicles, comprising a casing secured to the post to turn therewith; a locking disk loosely arranged in the casing and provided with a bolt hole, said disk also having a rearwardly-extending arm which projects exteriorly of the casing and which is rigidly fastened to the vehicle frame; a key-actuated cylinder lock disposed in the casing; a bolt movable into and out of engagement in said bolt hole to lock the casing against turning; guiding means for the bolt; and connections between the lock cylinder and the bolt for operating the latter when the former is rotated.

3. A steering post lock for vehicles, comprising a hollow member rigidly connected with the post to turn therewith; a member rigidly connected with the vehicle frame and having a bolt hole; a bolt movable into and out of engagement in said bolt hole to lock the two members against relative movement; and a key-actuated lock disposed in the hollow member for operating said bolt.

4. A steering post lock for vehicles, comprising a hollow member rigidly connected with the post to turn therewith; a member rigidly connected with the vehicle frame and having a bolt hole; a bolt movable into and out of engagement in said bolt hole to lock the two members against relative movement; a key-actuated cylinder lock disposed in the casing; and connections between the lock cylinder and the bolt for operating the latter when the former is rotated.

In testimony whereof I affix my signature.

RENATO BARONIS.